United States Patent
Johnson

(10) Patent No.: US 10,584,264 B1
(45) Date of Patent: Mar. 10, 2020

(54) HYDROPHOBIC AND OLEOPHOBIC COATING COMPOSITIONS

(71) Applicant: Newtech LLC, Cincinnati, OH (US)

(72) Inventor: Steven Martin Johnson, Franklin, OH (US)

(73) Assignee: Newtech LLC, Cincinnati, OH (US)

( * ) Notice: Subject to any disclaimer, the term of this patent is extended or adjusted under 35 U.S.C. 154(b) by 68 days.

(21) Appl. No.: 15/440,839

(22) Filed: Feb. 23, 2017

Related U.S. Application Data

(60) Provisional application No. 62/300,043, filed on Feb. 25, 2016.

(51) Int. Cl.
| | | |
|---|---|---|
| C09D 183/14 | (2006.01) |
| C09D 5/14 | (2006.01) |
| B05D 3/00 | (2006.01) |
| C08L 83/16 | (2006.01) |
| C08L 33/16 | (2006.01) |
| C09D 183/16 | (2006.01) |

(52) U.S. Cl.
CPC .......... *C09D 183/14* (2013.01); *B05D 3/007* (2013.01); *C09D 5/14* (2013.01); *C09D 183/16* (2013.01); *C08L 33/16* (2013.01); *C08L 83/16* (2013.01)

(58) Field of Classification Search
CPC combination set(s) only.
See application file for complete search history.

(56) References Cited

U.S. PATENT DOCUMENTS

| | | |
|---|---|---|
| 2,564,674 A | 8/1951 | Cherenls |
| 5,178,916 A | 1/1993 | Chidsey et al. |
| 5,266,115 A | 11/1993 | Taccon et al. |
| 5,415,927 A * | 5/1995 | Hirayama ............... B32B 17/06 428/307.3 |
| 5,821,022 A | 10/1998 | Ohishi et al. |
| 6,207,346 B1 | 3/2001 | Johnson |
| 6,444,378 B1 | 9/2002 | Johnson |
| 6,660,392 B2 | 12/2003 | Yamaguchi et al. |
| 6,811,931 B1 * | 11/2004 | Fujioka ..................... G03F 1/48 430/269 |
| 7,141,140 B2 | 11/2006 | Maccone et al. |
| 7,261,768 B2 | 8/2007 | Luten et al. |
| 7,471,503 B2 | 12/2008 | Bruner et al. |
| 7,622,157 B2 | 11/2009 | Falk et al. |
| 7,625,149 B2 | 12/2009 | Hanson et al. |
| 7,691,478 B2 | 4/2010 | Avaltroni et al. |
| 7,740,940 B2 | 6/2010 | Hanson |
| 7,879,437 B2 | 2/2011 | Hanson |
| 7,901,777 B2 | 3/2011 | Hanson |
| 7,989,069 B2 | 8/2011 | Bruner et al. |
| 8,025,974 B2 | 9/2011 | Hanson et al. |
| 8,048,487 B2 | 11/2011 | Hanson |
| 8,053,081 B2 | 11/2011 | Petcavich et al. |
| 8,067,103 B2 | 11/2011 | Hanson |
| 8,178,004 B2 | 5/2012 | Hanson |
| 8,236,426 B2 | 8/2012 | Hanson et al. |
| 8,309,228 B2 | 11/2012 | Dierdorf et al. |
| 8,329,830 B2 | 12/2012 | Yang et al. |
| 8,337,985 B2 | 12/2012 | Hanson |
| 8,432,036 B2 | 4/2013 | Hanson et al. |
| 8,445,423 B2 | 5/2013 | Bruner et al. |
| 8,524,367 B2 | 9/2013 | Hanson |
| 8,558,117 B2 | 10/2013 | Hanson |
| 8,658,258 B2 | 2/2014 | Hanson |
| 9,994,732 B1 * | 6/2018 | Johnson ............... C09D 183/16 |
| 2002/0111391 A1 * | 8/2002 | Ishizeki ................... C09D 4/00 522/120 |
| 2003/0234272 A1 | 12/2003 | Lamothe et al. |
| 2004/0023048 A1 | 2/2004 | Schwartz et al. |
| 2008/0131709 A1 | 6/2008 | Hanson et al. |
| 2008/0152930 A1 | 6/2008 | Hanson |
| 2009/0140028 A1 | 6/2009 | Forti et al. |
| 2009/0317554 A1 | 12/2009 | Christensen et al. |
| 2010/0015453 A1 | 1/2010 | Yamaguchi et al. |
| 2010/0331487 A1 | 12/2010 | Yang et al. |
| 2010/0331498 A1 | 12/2010 | Yang et al. |
| 2011/0195246 A1 | 8/2011 | Hanson et al. |
| 2012/0189843 A1 | 7/2012 | Chang et al. |
| 2013/0037161 A1 | 2/2013 | Hanson et al. |
| 2013/0229378 A1 | 9/2013 | Iyer et al. |
| 2014/0272150 A1 | 9/2014 | Hanson |
| 2014/0272428 A1 | 9/2014 | Hanson |
| 2014/0329001 A1 | 11/2014 | Rouaud et al. |

(Continued)

FOREIGN PATENT DOCUMENTS

| | | | |
|---|---|---|---|
| CA | 2626990 A1 | 5/2007 | |
| CN | 102137722 A | 7/2011 | |
| DE | 3421969 A1 * | 12/1984 | ........... C09B 47/045 |

(Continued)

OTHER PUBLICATIONS

Machine translation fo DE 3421969, retrieved Mar. 2019 (Year: 2019).*
Elif Alyamac & Mark D. Soucek, "Acrylate-based fluorinated copolymers for high-solids coatings", 71 Progress in Organic Coatings 213-224 (2011).
Steve Henly, "New Generation Fluoropolymer Coatings for Electronic Applications", Feb. 9, 2011; 5 pages.
"3M Electronic Grade Coatings", Walbom A/S, Sep. 21, 2013 (available at: www.walbom.dk/ref.aspx?id=4858); 3 pages.
"Features and Benefits—Lumiflon FEVE Resins", http://lumiflonusa.com/features-benefits/ (accessed Feb. 25, 2016); 9 pages.
International Search Report (ISR) and Written Opinion of the Searching Authority in App No. PCT/US2016/060410 dated Mar. 17, 2017.

*Primary Examiner* — Nicole M. Buie-Hatcher
(74) *Attorney, Agent, or Firm* — Ulmer & Berne LLP

(57) ABSTRACT

A hydrophobic and oleophobic coating composition includes at least a polysilazane polymer, a fluoroacrylate copolymer, and a thermosetting fluorinated polymer. The coating composition can be applied to a substrate in a single-step process as a thick and durable polymeric layer. Methods for making the coating composition and related articles are also provided.

21 Claims, No Drawings

(56) References Cited

U.S. PATENT DOCUMENTS

2015/0219801 A1* 8/2015 Shibuya .................. C03C 17/28
359/601
2015/0252656 A1 9/2015 Hanson

FOREIGN PATENT DOCUMENTS

| EP | 0513727 | A2 | 11/1992 | | |
|----|---------|----|---------|---|---|
| EP | 0513727 | B1 | 8/1995 | | |
| EP | 0745568 | A1 | 12/1996 | | |
| EP | 0745567 | B1 | 4/1999 | | |
| EP | 0745568 | B1 | 7/1999 | | |
| EP | 1378526 | A1 | 7/2004 | | |
| EP | 1955638 | B1 | 4/2012 | | |
| EP | 1570014 | B1 | 3/2013 | | |
| EP | 2868722 | A1 * | 5/2015 | .......... | C08F 290/067 |
| WO | 2006071981 | A1 | 7/2006 | | |
| WO | 2008042986 | A2 | 4/2008 | | |
| WO | 2008060582 | A2 | 5/2008 | | |
| WO | 2008060583 | A2 | 5/2008 | | |
| WO | 2009008993 | A2 | 1/2009 | | |

* cited by examiner

HYDROPHOBIC AND OLEOPHOBIC COATING COMPOSITIONS

REFERENCE TO RELATED APPLICATIONS

The present application claims the priority benefit of U.S. provisional application Ser. No. 62/300,043, entitled HYDROPHOBIC AND OLEOPHOBIC COATING COMPOSITIONS, filed Feb. 25, 2016, and hereby incorporates the same application herein by reference in its entirety.

TECHNICAL FIELD

The present disclosure generally relates to curable coating compositions including a polysilazane, a fluoroacrylate copolymer, and a thermosetting fluorinated polymer that produce highly durable and effective coating layers in a single-step curing process.

BACKGROUND

Compositions that form hydrophobic and oleophobic coatings can be useful to render surfaces repellant to both water-based and organic-based materials. Such surfaces having hydrophobic and oleophobic coatings would generally be easier to clean, be non-staining, and have a low surface energy. Surfaces with a low surface energy can be useful, for example, in industrial and consumer goods to provide a high degree of slip, or anti-stiction, to materials that contact the surface. However, prior hydrophobic and oleophobic coatings suffer from a number of detriments including poor temperature performance, lack of flexibility, stress cracking, lack of resistance to ultraviolet light, poor adhesion and poor environmental resistance when applied as a relatively thick coating (e.g., about 1 micrometer to about 4 micrometers or more). Therefore, there is a need for a more durable coating that can easily be applied to render the surface of a substrate both hydrophobic and oleophobic.

SUMMARY

In accordance with one embodiment, a coating composition includes a polysilazane, a fluoroacrylate copolymer, and a thermosetting fluorinated polymer. The polysilazane has at least one reactive site.

In accordance with another embodiment, a method of forming a coated article includes providing a substrate, coating the substrate with a coating composition, and curing coating composition. The coating composition includes a polysilazane, a fluoroacrylate copolymer, and a thermosetting fluorinated polymer. The polysilazane has at least one reactive site.

In accordance with another embodiment, an article includes a substrate, and a hydrophobic coating layer. The hydrophobic coating layer adheres to at least a portion of the substrate and is formed from a coating composition. The coating composition includes a polysilazane, a fluoroacrylate copolymer, and a thermosetting fluorinated polymer. The polysilazane has at least one reactive site.

DETAILED DESCRIPTION

Improved coating compositions that can impart hydrophobic and oleophobic qualities to a substrate can include a suitable polysilazane, a suitable fluoroacrylate copolymer, and a suitable thermosetting fluorinated polymer. On a dry solids weight basis, the fluoroacrylate copolymer can be included in an improved coating composition at about 1 part fluoroacrylate copolymer to about 2.9 parts or more polysilazane and about 2.9 parts or more thermosetting fluorinated polymer. For example, in certain embodiments, an improved coating composition can include about 1 part fluoroacrylate copolymer to about 7 parts or more polysilazane and about 2.9 parts or more thermosetting fluorinated polymer. In other certain embodiments, an improved coating composition can include about 1 part fluoroacrylate copolymer to about 2.9 parts or more polysilazane and about 7 parts or more thermosetting fluorinated polymer.

In certain embodiments, relatively larger quantities of polysilazane and thermosetting fluorinated polymer can be included in an improved coating composition. For example, in certain embodiments, an improved coating composition can include about 1 part fluoroacrylate copolymer to about 700 parts or less polysilazane and about 290 parts or less thermosetting fluorinated polymer. In certain embodiments of an improved coating composition, the coating composition can include about 1 part fluoroacrylate copolymer to about 290 parts or less polysilazane and about 700 parts or less thermosetting fluorinated polymer.

In certain embodiments, the combined fluoroacrylate copolymer, polysilazane, and thermosetting fluorinated polymer can constitute, on a dry solids weight basis, from about 0.1% to about 90.0% of an improved coating composition, from about 20% to about 60% of an improved coating composition in certain embodiments, and from about 30% to about 40% of an improved coating composition in certain embodiments.

Suitable polysilazanes can generally include curable oligomeric and polymeric polysilazanes having a common repeating unit represented by Formula 1.

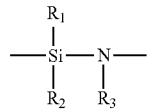

Formula 1 wherein $R_1$, $R_2$, and $R_3$ are each independently hydrogen, an organic group, a heterorganic group, or a combination thereof.

Specific polysilazanes useful in the formation of an improved coating composition can include polysilazanes that have at least one chemically reactive site. For example, suitable polysilazanes can include one, or more, of the following reactive sites: silicon-nitrogen linkages, hydrogen bonds, and carbon-carbon double bonds. As can be further appreciated, such polysilazanes can be any polymer that has at least one linear, cyclic, or branched main chain or backbone formed from repeating Si—N linkages.

The specific molecular structure, molecular weight, and functional groups of suitable polysilazanes can be tailored to meet the particular properties and performance desired in a coating composition. For example, in certain embodiments, a suitable polysilazane can have a number average molecular weight of about 100 to about 50,000 to ensure the improved coating composition can be applied to a substrate in liquid form.

Suitable polysilazanes can be produced through any desirable process including, for example, the process disclosed in U.S. Pat. No. 2,564,674 which is hereby incorporated by reference in its entirety. As will be appreciated, other methods can also be used to produce suitable polysilazanes.

Modified polysilazanes or polysilazane copolymers can also be utilized. Such modified polysilazanes or polysilazane copolymers can have random, alternating, or block copolymer structures or combinations. Modified polysilazanes and copolymers can be produced in a suitable aprotic solvent, such as, for example, ethyl acetate, t-butyl acetate, or combinations thereof and can be further diluted by one, or more, solvents if desired.

Alternatively, suitable polysilazanes can be commercially obtained. Examples of commercially available suitable polymers include, for example, CERASET® 20 from Kion Corp. (Huntington Valley, Pa.,) with has the following structure of Formula 2:

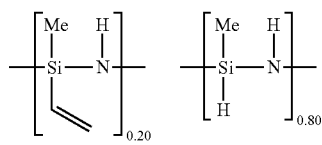

Formula 2

Another commercially available polysilazane is VL 20 from KiON Corp. (Huntington Valley, Pa.) with has the structure of Formula 3:

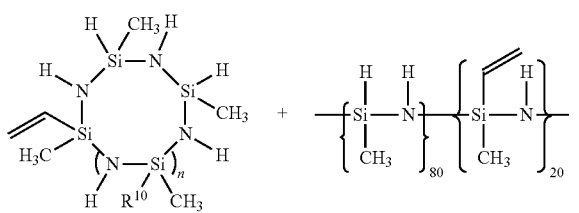

Formula 3 wherein n is an integer value ranging from 1-20, and $R^{10}$ is hydrogen or a vinyl group.

Other commercially available polysilazane polymers include, but are not limited to, those sold under the trade name, METAL PROTECTOR from nanoShell Ltd. (Plymouth, Devon, UK), DURAZONE from A.Z. Chemicals (Charlotte, N.C., USA), POLYMERIC SILAZANE FINISH ("PSF") from Kadko Incorporated (Beech Grove, Ind.), and MC156 from NIC Industries (White City, Oreg.).

In certain embodiments, a polysilazane can be prepared as a solution in a suitable solvent such as, for example, an aprotic solvent. Such solvents are well known and include, as illustrative examples, tert-butyl alcohol, and amyl acetate. It will be appreciated that other suitable aprotic solvents may be used.

In such solutions, the concentration of polysilazane can vary from about 10% to about 20%, or more, in certain embodiments, from about 50% to about 90% in certain embodiments, and from about 20% to about 50% in certain embodiments. It can be appreciated that the polysilazane solutions can, however, be further diluted by one or more solvents as needed depending on the desired properties of the coating composition.

Additional solvents that can be suitable for dilution of the polysilazane or the coating composition include fluorinated solvents such as ethyl nonafluorobutyl ether, ethyl nonafluoroisobutyl ether, and parachlorobenzotrifluoride. Examples of commercial fluorinated solvents include NOVEC hydrofluoroether solvents available from 3M Corporation (St. Paul, Minn.) and GALDEN® perfluorinated fluids available from Solvay Chemicals (Orange, Tex.).

In certain embodiments, additional solvents such as mineral spirits and hydrocarbon solvents can also be present in the coating composition.

As can be appreciated, a blend of more than one polysilazane can also be used in certain embodiments. A blend of multiple polysilazanes can be useful to achieve certain desirable properties in an improved coating composition.

Suitable fluoroacrylate copolymers useful for inclusion in an improved coating composition can include copolymers having at least a fluorinated moiety and an acrylate moiety. Such fluorinated moieties can generally be represented by Formula 4:

$$R_{(a)}-Y_{(b)}-$$  Formula 4 wherein R is a monovalent or multivalent, linear, branched, alicyclic or aromatic, fluorinated or perfluorinated, organic or heterorganic group, or a combination thereof containing at least one perfluorinated carbon atom and (a) is at least 1; and Y is independently a covalent bond or a divalent linear, branched, alicyclic, or aromatic organic or heterorganic linking group or a combination thereof, and can optionally be fluorinated or perfluorinated, and can optionally have cross-linkable sites, and (b) is 0 or greater.

Suitable acrylate moieties for the fluoroacrylate copolymer can generally be represented by Formula 5:

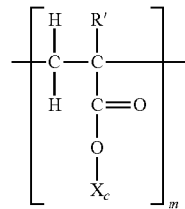

Formula 5 wherein $X_c$ can be a monovalent or multivalent, linear, branched, alicyclic or aromatic, fluorinated or perfluorinated, organic or heterorganic group or a combination thereof, and contains at least one perfluorinated carbon atom and c is a least 1; R' is H, $CH_3$, F, or another functional group; and m is at least 2. As can be appreciated, in certain embodiments, $X_c$ can also be $R_{(a)}$-$Y_{(b)}$ as represented in Formula 4.

As will be appreciated, suitable fluoroacrylate copolymers can contain additional functional groups or moieties in addition to the fluorinated moieties and acrylate moieties. The inclusion of other functional groups and the properties of the bulk fluoroacrylate copolymer can be selected to tailor specific properties of an improved coating composition including, for example, adhesion strength, viscosity, and durability.

In certain embodiments, suitable fluoroacrylate copolymers can react with at least one of the reactive sites of a suitable polysilazane polymer. For example, a fluoroacrylate copolymer can react with one or more of the silicon-nitrogen bonds, nitrogen-hydrogen bonds, silicon-hydrogen bonds, carbon-carbon double bonds, or hydrogen bonding reactive sites on a suitable polysilazane. As will be appreciated, the structure of the fluoroacrylate copolymer can influence the degree and kinetics of such a reaction. For example, in certain embodiments, the fluoroacrylate can be linear, or branched, and can be of any suitable molecular weight.

In certain embodiments, it can be useful to react the fluoroacrylate copolymer with a polysilazane in a liquid solution. Suitable fluoroacrylate copolymers can be produced as a solution by dissolving a solid fluoroacrylate copolymer in a suitable solvent. In such solutions, the weight percent of solid fluoroacrylate copolymer can vary from about 0.1% to about 10%, or more, in certain embodiments, from about 0.5% to about 5% in certain embodiments, and from about 1.0% to about 2.0% in certain embodiments. It can be appreciated that the fluoroacrylate copolymer solution can, however, be further diluted by one or more solvents as needed depending on the desired properties of the coating composition.

The solvent or combinations of solvents chosen can be determined by the solubility of the monomers and resultant polymers. Conventional solvents such as ethyl acetate, t-butyl-acetate, methyl ethyl ketone, and acetone can be used. As can be appreciated however, fluorinated solvents can also be used including chlorofluorocarbon solvents, hydrofluoroether solvents, and the like. In certain embodiments, combinations of conventional solvents and fluorinated solvents can also be used to modify the solubility and boiling points of the coating composition. Modification and selection of such combinations can be used to tailor the properties of the coating composition including for example, drying and curing times, or substrate compatibility. As a specific example, a less viscous solution can be used when the coating composition is intended for use on smoother substrates.

Suitable fluoroacrylate copolymers can be produced by any known method including for example, the methods disclosed in International Application WO 2006/071981; U.S. Pat. No. 5,821,022; and European Patent App. 1,378, 526 each herein incorporated by reference in their entirety. A journal article by Alyamac and Soucek, in Progress in Organic Coatings 71 (2011) 213-224, further discusses methods useful in the preparation of fluoroacrylate copolymers.

Alternatively, in certain embodiments, commercial fluoroacrylate copolymers can be used. For example, commercial fluoroacrylate copolymers including APG-658 and APG-801 by Advanced Polymer Inc. (Carlstadt, N.J.), NOVEC 1700 and NOVEC 2702 by 3M Co. (St. Paul, Minn.) and APS 2324CA can be used as suitable fluoroacrylate copolymers. In certain embodiments, NOVEC 1720, a 0.1% fluorosilane available from 3M Co. (St. Paul, Minn.) can also be used.

As can be appreciated, a blend of one or more fluoroacrylate copolymers can also be used. A blend of fluoroacrylate copolymers can be useful to balance the properties conferred by different fluoroacrylate copolymers.

Suitable thermosetting fluorinated polymers useful for inclusion in an improved coating composition can include fluoroethylene vinyl ether ("FEVE") polymers and poly (vinylidene fluoride) ("PVDF") polymers and compositions thereof.

FEVE polymers can generally be described by Formula 6:

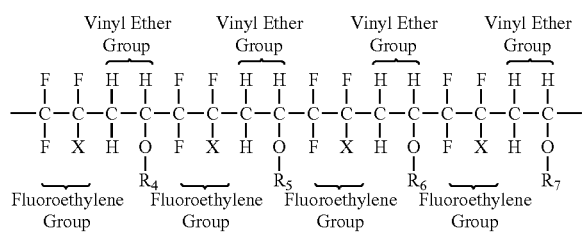

Formula 6 wherein X can be H, F, an alkyl group, cycloalkyl group, alkylene group, cycloalkylene group or any other organic group chosen to impart specific properties and $R_4$, $R_5$, $R_6$, and $R_7$ can each independently be a hydroxyl group, alkyl group, cycloalkyl group, alkylene group, or cycloalkylene group. As can be appreciated, $R_4$, $R_5$, $R_6$, and $R_7$ can all be the same or can independently differ so as to impart, or influence, specific properties of the FEVE polymer and the properties of the improved coating composition. Properties influenced by $R_4$, $R_5$, $R_6$, and $R_7$ can include the transparency, glossiness, hardness, flexibility, crosslinkability, adhesiveness, and pigment compatibility of the FEVE polymer and the improved coating composition. Suitable FEVE polymers may be supplied in a solvent solution or as a solid neat resin. Certain FEVE polymers can be selected for their effect on the improved coating compositions. For example, the inclusion of a FEVE polymer can make an improved coating composition more resistant to cracking after curing on a substrate.

As will be appreciated, suitable FEVE polymers can include additional functional groups or moieties in addition to the moieties shown in Formula 6. The inclusion of such functional groups can be selected to tailor, or influence, specific properties of the improved coating composition including, for example, adhesion strength, viscosity, and durability.

In certain embodiments, suitable FEVE polymers can be commercially obtained. For example, certain FEVE polymers including LUMIFLON FEVE polymers (Asahi Glass Company, Exton, Pa.) and DURABRITE FEVE polymers (PPG Industries, Pittsburgh, Pa.) can be suitable.

Suitable PVDF polymers, generally formed from the polymerization of vinylidene fluoride, can generally by illustrated by formula 7:

Formula 7

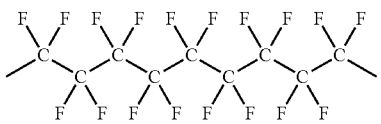

Generally, PVDF polymers exhibit a number of beneficial properties making them a suitable thermosetting fluorinated polymer for the improved coating compositions described herein. For example, PVDF polymers exhibit excellent durability, appearance, solvent resistance, and mechanical properties such as high flexibility. PVDF polymers can be included in the improved coating compositions to form coatings that also exhibit such improved benefits.

In certain embodiments, it can be useful to supply a PVDF polymer to the improved coating compositions as a PVDF composition. For example, PVDF compositions can by formed my mixing certain quantities of an acrylic resin, such as poly(methyl methacrylate) ("PMMA") with PVDF polymer. The inclusion of acrylic resins can improve the properties of PVDF polymer. For example, suitable acrylic resins can include functional groups which improve the wetting properties and coating adhesion of a PVDF composition. Generally, suitable acrylic resins can include any acrylic resins thermodynamically miscible with PVDF.

Additionally, acrylic resins can modify the microscopic phase structure of a PVDF composition. For example, the addition of an acrylic resin can allow for the formation of a high temperature miscible alloy of PVDF polymer and acrylic resin having both crystalline PVDF and an amorphous phase formed of the PVDF polymer and the acrylic resin. Such microscopic phase structures can enable PVDF compositions to exhibit improved flexibility and solvent resistance. As can be appreciated however, PVDF compositions including excessive acrylic resins can also be more prone to suffer from photochemical degradation and hydrolysis. Generally, the quantity of an acrylic resin in a PVDF composition can vary depending upon characteristics such as the desired amount of coating adhesion and weatherability needed for the improved coating compositions described herein. In certain embodiments, about 50% to about 90% of a PVDF composition can be PVDF polymer with the remainder being an acrylic resin. In certain embodiments, about 70% to about 80% of a PVDF composition can be PVDF polymer with the remainder being an acrylic resin. In certain embodiments, substantially all of a PVDF composition can be a PVDF polymer.

In certain embodiments, suitable PVDF polymers and PVDF compositions can be commercially obtained. For example, a PVDF composition branded as KYNAR 500 (Arkema Inc., King of Prussia, Pa.) can be a suitable thermosetting fluorinated polymer composition for the improved coating compositions described herein.

A blend of multiple thermosetting fluorinated polymers can also be included in certain embodiments of an improved coating composition. For example, multiple FEVE polymers or a blend of FEVE polymers and PVDF polymers can be included to achieve a beneficial blend of properties. In certain embodiments including both FEVE polymers and PVDF polymers, it can be preferable to include relatively more of an FEVE polymer than a PVDF polymer.

Generally, an improved coating composition can be formed by mixing a suitable solution of polysilazane, a suitable solution of fluoroacrylate copolymer, and a suitable thermosetting fluorinated polymer. The thermosetting fluorinated polymer can be in a neat form or can be dispersed in a solvent.

In certain embodiments, additional solvents can be added to improve certain properties of the improved coating composition such as, for example, the solubility and boiling point of the coating composition. In such embodiments, the additional solvent can be an aprotic solvent, a fluorinated solvent, or a combination thereof. Selection and quantity of the solvent compounds can allow the improved coating composition to be tailored for specific substrates and for specific drying times.

In certain embodiments, the improved coating composition can be formed from the mixture of polysilazane, fluoroacrylate copolymer and the thermosetting fluorinated polymer by slowly mixing the components with a low-shear mixer or other appropriate stirring mechanism until a homogenous composition is reached. For example, mixing speeds of about 200 rpm to about 500 rpm can be used. The improved coating composition can, in certain embodiments, be formed at room temperature (e.g., at about 23° C.).

As can be appreciated, other additives can be added to the improved coating composition in certain embodiments. For example, one or more color dyes or pigments, UV or light stabilizers, anti-oxidants, flame retardants, stabilizers, fillers, solvents, rheology modifying agents, or other ancillary material can be added to the coating composition. Such additives can be added to the improved coating composition in any order and in any suitable quantity. Fillers can be used to adjust rheology, reduce polymer demand, improve hardness, scratch-resistance, modulus or other properties. Non-limiting examples of such fillers include inorganic particles such as, for example, silicon dioxide, aluminum oxide, cerium oxide, tin oxide, zinc oxide, clays, barium sulfate, and talc. Organic functional fillers and powders, including for example, micronized polytetrafluoroethylene can also be used.

In particular embodiments, anti-microbial compounds can be added to the improved coating composition to impart anti-microbial properties to the composition and coatings formed from the composition. Generally, any anti-microbial compound can be added to impart anti-microbial properties including compounds having an active compound formed of silver, copper, titanium dioxide, zinc, certain organic materials, and derivatives and combinations thereof. Suitable commercial products can include compounds from Sciessent (Auburn, Mass.), Microban (Huntersville, N.C.), Nano-BioMatters (Marlborough, Mass.) and BioCote (Coventry, United Kingdom). The quantity of anti-microbial compound can vary from about 0.1% to about 10% or more, by weight, of the improved coating composition in certain embodiments, from about 0.5% to about 5%, by weight, of the improved coating composition in certain embodiments, and from about 1.0% to about 2.0%, by weight, of the improved coating composition in certain embodiments.

As an illustrative example of an improved coating composition having anti-microbial properties, a silver compound bound in a zeolite carrier can be added to the coating composition. In such embodiments, the active silver can be released under environmental conditions only where moisture is present. An example of such a silver compound is AGION AJ1OD produced by Sciessent of Auburn, Mass. Substrates coated with an improved coating compositions including AGION AJ10D can provide anti-bacterial properties at the coating surface.

In certain embodiments, one or more, monomers, oligomers or polymers can be incorporated into the improved coating composition to impart, or control, certain qualities of the coating composition. Non-limiting examples of such additional monomers, oligomers, and polymers include epoxies, urethanes, acrylics, and silicone.

In certain embodiments, an improved coating composition can be filtered after mixing using any known filtering technique such as, for example, through use of filter paper, filter cartridges, or filter bags. Filtering can be performed to remove certain additives or to create a more uniform distribution of additives and the filter size and level can be selected based on these application requirements. A suitable example of a filtering method is the use of 0.45 micron polytetrafluoroethylene syringe filters to filter the coating composition.

An improved coating composition can be used immediately or stored for future use. Generally, an improved coating composition can be stable and can used indefinitely, provided the components remain in solution. However, for long-term storage of an improved coating composition, it can be advantageous to contain or vent ammonia which is gradually outgassed from polysilazane. Such outgassed ammonia can be contained or vented by any suitable means. Alternatively, the ammonia can also be displaced by inert nitrogen gas.

The improved coating composition can be applied to a substrate and cured in a single-step process to form a hydrophobic and oleophobic coating layer on the substrate. The curing process can involve the evacuation of the solvent through evaporation and the coincident curing of the reactive components. Evacuation of the solvent can take place at ambient temperature or can be accelerated by use of elevated temperatures (e.g., temperatures of about 100° C. or more).

However, it should be appreciated that elevated temperatures are not needed and the entire curing process can take place at about room temperature (e.g., at about 23° C.).

In certain embodiments, the reactive components can cure through one, or more, coincident reactions including reaction of the fluoroacrylate copolymer and the thermosetting fluorinated polymer with reactive groups on the polysilazane; independent curing of the polysilazane; and covalent bonding of silanol groups on the polysilazane to hydroxyl groups of the substrate. Such reactions are considered coincident in that the reactions take place in the same process step but not necessarily the same time. For example, in certain embodiments, at least one of the reactions can take place at a different time than one of the other reactions. For example, the polysilazane can bond to a substrate before reacting with the fluoroacrylate copolymer and the thermosetting fluorinated polymer in certain embodiments. In certain embodiments, the thermosetting fluorinated polymer may not react with the polysilazane or the fluoroacrylate copolymer but can add flexibility to the coating composition by lowering the overall glass transition temperature. The coincident reactions can occur in a single process step that occurs over a period of time from about a 0.5 hour to about 120 hours. As will be appreciated, the selection of particular polysilazanes, fluoroacrylate copolymers and thermosetting fluoropolymer can affect the amount and quantity of reactions between such components and the ultimate properties of the cured coating composition.

In certain embodiments, moisture can be introduced, directly or indirectly, to accelerate the reaction. Additionally, or alternatively, known moisture curing catalysts can also be included in the coating composition. Such catalysts can include, but are not limited to, ammonia and the catalysts disclosed in U.S. Patent App. No. 2010/0331498 herein incorporated by reference. Moisture cure catalysts can be included in amounts ranging from about 0.1% to about 10%, by weight, based on a dry weight basis of the catalyst and polysilazane. Curing can be accomplished at room temperature or thermal energy may be utilized including, for example, convection or induction heating, irradiation from an electron beam generator or microwave, or radiation.

The improved coating compositions disclosed herein can be applied to a large variety of articles including, without limitation, mobile devices, glass substrates in transportation and construction industries, polymeric parts, metal parts, and paint surfaces. Specific substrates can offer specific benefits. For example, substrates with oxides on the surface such as cold rolled steel, iron, copper, brass, stainless steel, glass, ceramics, and the like will enable covalent bonding to the coating composition by bonding to silanol groups of certain polysilazane polymers. In such cases, hydroxyl groups on the substrate can be activated in any suitable process including, for example, the use of an alkaline cleaner. However, the improved coating composition disclosed herein can still be applied to surfaces, such as certain polymers, substantially free of hydroxyl groups. On such substrates substantially free of hydroxyl groups, the coating composition can adhere to the substrate through, for example, physical force.

In certain embodiments, the improved coating composition can also be used as an additive to improve other coating materials and resins. Additionally, the improved coating composition can also be utilized as a surface-active agent, to coat, for example, inorganic fillers, thus improving hydrophobicity, oleophobicity, or dispensability.

The improved coating composition can exhibit a variety of beneficial qualities when cured on a substrate. For example, the coating can be a thick, durable coating that has a high degree of hydrophobicity and oleophobicity. In certain embodiments, the contact angle of water on the cured hydrophobic coating layer can be about 80° to about 120°, or more, when measured in accordance with ASTM D7334-08. A water contact angle of about 80° to about 120°, or more, can indicate the coating layer is hydrophobic.

In certain embodiments, the contact angle of n-hexadecane on the cured hydrophobic coating layer can be about 50° to about 80°, or more. Measurement of the contact angle of n-hexadecane can generally indicate oleophobicity with contacts angles of about 50° to about 80°, or more, considered oleophobic. Oleophobicity can, in certain embodiments, also be indicated by the speed at which a drop of isopropyl alcohol pulls back from a cured coating layer.

Additionally, the cured coating composition can have a low surface energy. The surface energy of a coating measures the ability of a coating to repel liquids and solids. The improved coating composition can, in certain embodiments, exhibit a surface energy of about 10 to about 20 dynes/cm$^2$.

Additionally, the coating formed from the improved coating composition, when properly applied, is able to maintain its hydrophobic, oleophobic, adhesion, flexibility, color and other properties when exposed to deleterious environmental exposure, for example, ultraviolet light, temperature extremes and humidity.

In certain embodiments, the cured coating formed from the improved coating composition can be hydrophobic, oleophobic, and anti-microbial such that the presence of bacteria is substantially reduced in accordance with standardized tests, for example, ASTM-2180.

In certain embodiments, the cured coating composition formed from the improved coating composition can be applied over a wide range of thicknesses. The thickness of the coating can be dependent on the application and environment in which the coated article is employed. For example, the coating composition can be as thin as about 0.1 micron while retaining good durability but can be produced in thicker layers if desired. For example, the coating can have a thickness from about 0.1 micron to about 10 microns in certain embodiments, from about 10 microns to 100 microns in certain embodiments, and from about 100 microns to about 1 mm in certain embodiments. The use of thicker layers can be useful, for example, when the coating composition is applied to rough substrates as a thicker coating can conform to irregularities in the substrate and can create a substantially planar surface. In certain embodiments including an anti-microbial compound, a thicker coating surface can be beneficial such as, for example, a thickness of about 1 micron to about 5 microns or more.

EXAMPLES

Inventive examples of an improved coating composition were prepared by mixing the components listed in Tables 1, by weight, in a 1 L glass beaker using a IKA RW 20 digital mixer (Cole-Parmer Co.) fitted with a JIFFY LM mixer blade (Jiffy Mixer Co.). Details of the components included in Table 1 include:

Polysilazane: CERAKOTE MC156 from NIC Industries (White City, Oreg.), polysilazane dissolved in tert-butyl acetate;

Fluorinated acrylate copolymer: NOVEC 2702 from 3M Co. (St. Paul, Minn.), fluorinated acrylate copolymer dissolved in ethoxy-nonfluorobutane solvent;

Thermosetting fluorinated polymer: LUMIFLON L-200F from Asahi Glass Company (Exton, Pa.), a solid FEVE polymer resin;
Anti-microbial compound: AGION AJ10D from Sciessent (Wakefield Mass.), silver based anti-microbial compound; and
Solvent: OXSOL® 100 from MANA Co. (New York, N.Y.), parachlorobenzotrifluoride.

TABLE 1

| Component | Example 1 | Example 2 | Example 3 |
|---|---|---|---|
| Polysilazane | 200 g | 200 g | 200 g |
| Fluorinated acrylate copolymer | 67 g | 67 g | 67 g |
| Solvent | 237 g | 67 g | 237 g |
| Thermosetting Fluorinated polymer | 64 g | — | 64 g |
| Anti-microbial compound | — | — | 5.7 |

To form the compositions of each Example, the components depicted in Table 1 were added in successive steps beginning with the polysilazane component which was added under constant agitation of about 200 revolutions per minute ("RPM"). Subsequently, the fluorinated acrylate copolymer was added to the solution and mixed for about 30 minutes. Oxsol solvent was then added to reduce viscosity and the percent solids and mixed for about 30 minutes. The thermosetting fluorinated polymer was then diluted by 50% in Oxsol solvent and then added to the polysilazane and fluoroacrylate copolymer solution and mixed for about 30 minutes. During mixing, the solution was maintained at about 23° C. and was covered with a polyethylene film to prevent evaporation of the solvent.

Example 3 further includes an antimicrobial compound. In Example 3, the anti-microbial additive was added as the last component. After addition of the anti-microbial compound, the solution was mixed at 23° C. for an additional 30 minutes.

Examples 1 and 2 were filtered through a 0.45 micron polytetrafluoroethylene syringe filter obtained from Cole-Parmer Co. (Vernon Hills, Ill.). Example 3 was similarly filtered just before the addition of the anti-microbial compound.

Each Example was spray coated onto 4"×4" No. 304 stainless steel coupons that were 10 thousandths of an inch thick (10 mils). The stainless steel surface of each coupon was first prepared by scrubbing with isopropyl alcohol, then scrubbing with TC 832 alkaline cleaner (available from Tru-Chem Company, Inc. of Columbus, Ohio), and then rinsed with deionized water before being allowed to dry. The Examples were sprayed on the steel coupons to produce a dry film having a thickness of approximately 4 microns. After spray coating, each sample was allowed to sit for 30 minutes at ambient temperature. The samples were then placed in an oven for 1 hour at 75° C. and at 50% relative humidity. After cooling, the samples were allowed to sit at ambient temperature for an additional 48 hours prior to testing.

Coatings formed from Examples 1 to 3 were tested for various physical properties on the previously described steel coupons as depicted in Table 2. Repellency to water was measured by deionized water contact angles using a PG-X Goniometer available from TMI Instruments (New Castle, Del.). Repellency to organic liquids was measured by dropping isopropyl alcohol onto the sample with a pipette 6 inches above the surface. Once the drop contacted the surface, the speed at which the drop pulled back into itself was rated on a 0-5 scale, with 0 indicating no pull-back and a 5 indicated an immediate pull-back. Hardness was measured by using a pencil hardness tester according to the standards of ASTM D-3363. Test equipment was obtained from Paul Gardner Company (Pompano Beach, Fla.). Adhesion was measured using a cross-hatch adhesion tester, according to the standards of ASTM D-3359 using an instrument from Precision Gage and Tool (Dayton, Ohio). Solvent resistance was measured by rubbing isopropyl alcohol ("IPA") and acetone on the surface with a pipette, allowing the solvent to sit for 60 seconds, and then rubbing with a Q-TIPS brand cotton swab. Observations were recorded as to whether the coating suffered visible damage. If the coating was not damaged, a ("+") was recorded. If the coating was damaged, a ("−") was recorded.

TABLE 2

| | Contact Angle Water (Degrees) | IPA Pull-Back | Pencil Hardness | Cross-Hatch Adhesion | Solvent Resistance IPA | Solvent Resistance Acetone |
|---|---|---|---|---|---|---|
| Example 1 | 107.1 | 5 | 9 H | 100 | + | + |
| Example 2 | 106.0 | 5 | 9 H | 100 | + | + |
| Example 3 | 107.0 | 5 | 9 H | 100 | + | + |

As reported in Table 2, the coatings of Examples 1 to 3 exhibited a variety of good physical properties. For example, each of the coatings formed from Examples 1 to 3 were hydrophobic and exhibited water contact angles greater than about 90°. Additionally, each of the coatings from Example 1 to 3 had strong adhesion and strength as demonstrated by positive results in the pencil hardness test, the cross hatch adhesion test, and solvent resistance tests. Oleophobicity was also observed for each coating as evidenced by an isopropyl alcohol pullback rating of 5.

Examples 1 to 3 were also measured for abrasion resistance according to the standards of ASTM D-2486 by rubbing each sample 2,000 times with 100% cotton, deionized water, or isopropyl alcohol using a JTX-11 instrument, available from Shanghai Pushen Chemical Machinery Company (Shanghai, China). The water contact angles after abrasion testing are reported in Table 3. Coatings formed from Examples 1 to 3 demonstrated strong abrasion resistance by exhibiting little decrease in water contact angles.

TABLE 3

| | 100% Cotton (degrees) | Water (degrees) | IPA (degrees) |
|---|---|---|---|
| Example 1 | 103.8 | 102.8 | 100.7 |
| Example 2 | 102.8 | 101.8 | 99.6 |
| Example 3 | 103.2 | 102.0 | 99.8 |

Examples 1 and 2 from Table 1 were also spray coated onto similar test panels to form a 4 micron thick coating. The panels were then mounted outdoors, facing south, in Cincinnati, Ohio, for 6 months from Jul. 15, 2015, to Jan. 15, 2016, to test against hot and cold temperature extremes, ultraviolet light, and humidity variations. Similarly prepared test panels were also placed in a environmental test chamber at 95% relative humidity and 65° C. for 168 hours. The water contact angle, IPA pull-back, pencil hardness, cross-hatch adhesion, solvent resistance, IPA solvent resistance, acetone resistance and appearance of each panel was then evaluated. The results of testing outdoors for 6 months are depicted in Table 4 and the results of testing in an environmental test chamber are depicted in Table 5.

TABLE 4

| Outdoor Exposure | Contact Angle Water (Degrees) | IPA Pull-Back | Pencil Hardness | Cross-Hatch Adhesion | Solvent Resistance IPA | Solvent Resistance Acetone | Appearance |
|---|---|---|---|---|---|---|---|
| Example 1 | 105.0 | 5 | 9 H | 100 | + | + | No Stress cracking |
| Example 2 | 104.3 | 5 | 9 H | 60 | + | + | Stress Cracking |

TABLE 5

| 168 Hours at 95% RH, 65° C. | Contact Angle Water (Degrees) | IPA Pull-Back | Pencil Hardness | Cross-Hatch Adhesion | Solvent Resistance IPA | Solvent Resistance Acetone | Appearance |
|---|---|---|---|---|---|---|---|
| Example 1 | 104.0 | 5 | 9 H | 100 | + | + | No Stress cracking |
| Example 2 | 104.2 | 5 | 9 H | 65 | + | + | Stress Cracking |

Tables 5 and 6 demonstrate that coatings formed from the compositions of Examples 1 and 2 demonstrate superior physical properties including hydrophobicity, oleophobicity, and durability. Example 2, which did not contain FEVE polymer, suffered from stress cracking and loss of adhesion. Examples 1 and 3 from Table 1 were also evaluated to determine their ability to reduce the number of bacteria in accordance with the standards of ASTM-2180. The evaluation was performed on stainless steel samples coated with the compositions of Examples 1 and 3. S. *Aureus* was used as the test bacteria. The results of two sample runs are shown in Table 6 in addition to the results of two assays run on uncoated stainless steel samples.

TABLE 6

| Sample Identification | Organism Count at Zero Contact Time (CFM/ml) | Organism Count at 24 Hours Contact Time (CFM/ml) | Percent Reduction** |
|---|---|---|---|
| Assay (+) | $1.0 \times 10^5$ | $5.8 \times 10^5$ | — |
| Assay (−) | <10* | <10* | — |
| Example 1 | — | $9.8 \times 10^7$ | No Reduction |
| Example 1 | — | $1.05 \times 10^8$ | No Reduction |
| Example 3 | — | <10* | 99.9999% |
| Example 3 | — | <10* | 99.9999% |

*<10 = Above limits of detection
**Percent reduction calculated using mean of T24 hour contact time As reported in Table 6, Example 1, without the anti-microbial compound, demonstrated no anti-microbial effect and no reduction in bacteria was observed. Example 3, including the anti-microbial compound, exhibited a reduction in the number of bacteria to a level below that which could be detected by the assay method.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium or solvating medium into account. Wet admixture refers to the coating composition with the dispersion medium or solvating medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A coating composition comprising:
    a polysilazane, the polysilazane having at least one reactive site;
    a fluoroacrylate copolymer; and
    a thermosetting fluorinated polymer, the thermosetting fluorinated polymer comprising one or more of fluoroethylene vinyl ether polymer and poly(vinylidene fluoride) polymer.

2. The coating composition of claim 1, wherein the fluoroacrylate copolymer is a perfluoroacrylate copolymer.

3. The coating composition of claim 1, further comprising one or more additives selected from the group consisting of color dyes, color pigments, UV stabilizers, light stabilizers, anti-oxidants, flame retardants, stabilizers, fillers, solvents, or rheology modifying agents.

4. The coating composition of claim 1 is colorless.

5. The coating composition of claim 1 exhibits one or more of the properties of hydrophobicity or oleophobicity when cured.

6. The coating composition of claim 1, further comprising an anti-microbial compound, the anti-microbial compound comprising silver, copper, titanium dioxide, zinc, an organic material, or a derivative or combination thereof.

7. The coating composition of claim 6, wherein the anti-microbial compound comprises a silver compound bound in a zeolite carrier.

8. A method of forming a coated article, the method comprising:
providing a substrate;
coating the substrate with a coating composition, the coating composition comprising:
a polysilazane, the polysilazane having at least one reactive site;
a fluoroacrylate copolymer; and
a thermosetting fluorinated polymer, the thermosetting fluorinated polymer comprising one or more of fluoroethylene vinyl ether polymer and poly(vinylidene fluoride) polymer; and
curing the coating composition.

9. The method of claim 8, wherein the step of curing the coating composition takes place in a coincident step.

10. An article comprising:
a substrate;
a hydrophobic coating layer, the hydrophobic coating layer adhering to at least a portion of the substrate; and
wherein the hydrophobic coating layer is formed from a coating composition comprising:
a polysilazane, the polysilazane having at least one reactive site;
a fluoroacrylate copolymer; and
a thermosetting fluorinated polymer, the thermosetting fluorinated polymer comprising one or more of fluoroethylene vinyl ether polymer and poly(vinylidene fluoride) polymer.

11. The article of claim 10, wherein the hydrophobic coating layer comprises a thickness of about 0.1 micron or greater.

12. The article of claim 10, wherein the substrate is a solder paste stencil.

13. The article of claim 10 is a mechanical part, the mechanical part selected from the group consisting of mobile devices, metal parts, polymeric parts, painted parts, and glass parts.

14. The article of claim 10, wherein the hydrophobic coating layer is oleophobic.

15. The article of claim 14, wherein n-hexadecane has a contact angle of about 50° to about 80°, or more, with the hydrophobic coating layer.

16. The article of claim 10, wherein the hydrophobic coating layer has a surface energy of about 13 to about 20 dynes/cm$^2$.

17. The article of claim 10, wherein the hydrophobic coating layer has a pencil hardness test result of at least 8H when tested in accordance with ASTM D-3363.

18. The article of claim 10, wherein the hydrophobic coating layer has a water contact angle of at least about 90° after 2,000 strokes with 100% cotton, deionized water, or isopropyl alcohol in accordance with ASTM D-2486.

19. The article of claim 10, wherein the thermosetting fluorinated polymer comprises fluoroethylene vinyl ether polymer.

20. The article of claim 10, wherein the coating composition further comprises an anti-microbial compound and wherein the hydrophobic coating layer exhibits anti-microbial behavior.

21. The article of claim 20, wherein the hydrophobic coating layer exhibits an about 99% or greater reduction in bacteria than an identical hydrophobic coating layer substantially free of an added anti-microbial compound when tested in accordance to American Society for Testing and Materials ("ASTM") standard 2180.

* * * * *